UNITED STATES PATENT OFFICE.

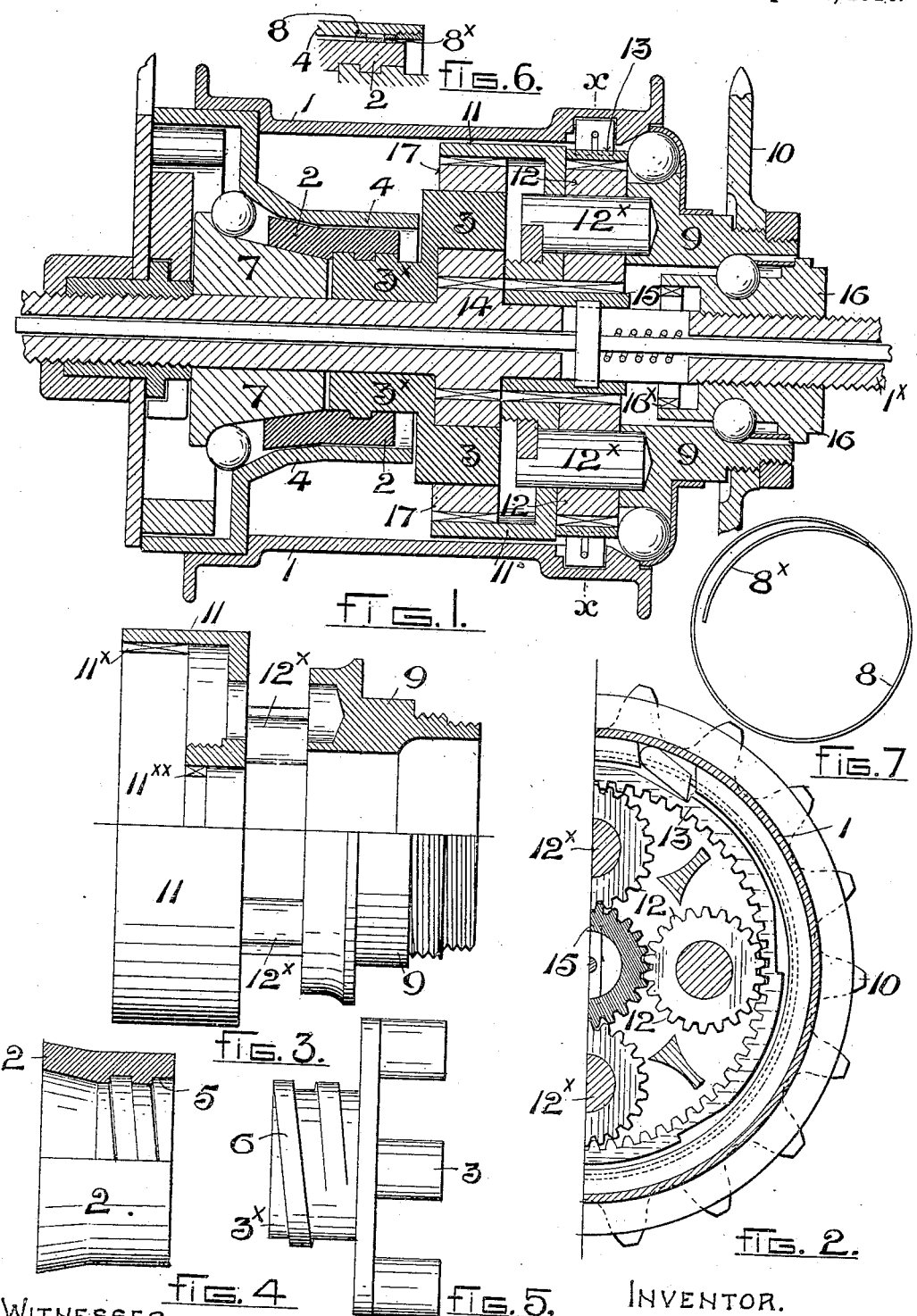

JAMES ARCHER, OF NOTTINGHAM, ENGLAND.

VARIABLE GEAR AND BRAKE MECHANISM.

954,664.　　　　　Specification of Letters Patent.　　Patented Apr. 12, 1910.

Application filed November 13, 1906. Serial No. 343,300.

*To all whom it may concern:*

Be it known that I, JAMES ARCHER, a subject of the King of Great Britain and Ireland, and resident of Nottingham, England, have invented certain new and useful Improvements in Variable Gear and Brake Mechanism for Velocipedes, of which the following is a specification.

This invention refers to and consists of an improved combination of three speed gear and back-pedaling brake for use with bicycles and the like. The invention is not, however, confined to the special gear hereinafter referred to, but is claimed as applied to any other and like combination of three speed gear and back pedaling brake.

Upon the accompanying drawing, Figure 1 illustrates a longitudinal section of a bicycle wheel hub fitted with the present invention, the parts being shown in the position they occupy when giving the "normal" speed. Fig. 2 illustrates a transverse section of Fig. 1 on line $x$—$x$. Figs. 3, 4, 5, 6 and 7 illustrate certain detail parts separately.

According to the invention use is made, with the hub 1, of a collar or sleeve 2, which lies around a tubular part $3^x$ of the planet cage 3 and within a bush 4, hereinafter called the hub bush. Such collar or sleeve 2 upon its interior is formed with a coarse screw-thread or worm 5, see Fig. 4, and upon the exterior of the said tubular part $3^x$ of the planet cage is a like screw-thread or worm 6, see Fig. 5, the two screw-threads or worms being designed to engage each other. The collar or sleeve 2 at one end is formed conical inside and outside, and such conical end corresponds to like conical parts of the hub bush 4 and the brake bush 7.

Carried by the hub bush 4 and acting upon the sleeve 2 (or vice versa) is a drag friction device. Such device, see Figs. 6 and 7, consists preferably of a ring 8 with a tongue or spur $8^x$ struck out of it, this latter always gently pressing upon the exterior of the sleeve, so that when the planet cage is rotated the friction causes the rotation of the sleeve to be momentarily retarded, and the sleeve, owing to the screw-threads, to be traversed endwise, one way or the other, according to the direction of rotation of the planet cage. When the sleeve is moved endwise in one direction its outer conical face engages the inner inclined or conical face of the hub bush 4, see Fig. 1, but when it is moved in the opposite direction its outer face leaves the hub bush and its inner conical face engages the brake bush. When the bicycle is wheeled backward by hand the sleeve 2 slacks off and lies clear of both the hub bush and the brake bush, or, at least, has no effect on either.

The variable three speed gearing is of any suitable type, but consists preferably of a driving member 9 to which is applied the sprocket or chain wheel 10 and in one with or connected to which is a gear ring 11 formed with internal spur teeth $11^x$ and clutch teeth $11^{xx}$. Carried by said driving member are the axes $12^x$ of a set of planetary pinions 12. Surrounding and meshing with the pinions 12 is the further gear ring 13, and between the said ring and the hub is ratchet mechanism for allowing the ring to drive the hub forward for the "high" and "normal" speeds, or allowing it to run free or permitting of the brake being applied on all three speeds. Upon the fixed axle $1^x$ of the hub are two sun pinions 14, 15, the former being fixed, and the latter loose and free to rotate and also capable of being slid along the axle for the purpose of engaging the clutch teeth $11^{xx}$ in the gear ring 11, or of engaging the clutch teeth $16^x$ in the bush 16 fixed to the axle $1^x$ or of being moved free of both. Carried by the planet cage is a further set of planetary pinions 17 which mesh with the fixed pinion 14.

With the parts in the position shown in Fig. 1 and the driver 9 rotated in the forward direction, the motion is imparted to the hub through the axes $12^x$, pinions 12 and gear ring 13 (which for the time being rotate solid with each other), the hub then rotating at the "normal" speed and over-running the sleeve 2, which has then no effect either on the hub or the brake. With the pinion 15 moved endwise until it becomes clutched to the teeth in the bush 16 and the driver still rotated in the forward direction, the motion is imparted to the hub through the axes $12^x$, pinions 12 and gear ring 13, which are then free, the hub then rotating at the "high" speed and again over-running the sleeve 2, which has still no effect either on the hub or the brake. With the pinion 15 made free of both the teeth in the bush 16 and the teeth $11^x$ in the gear ring 11, and with the driver rotated in the forward direction, the motion is then imparted to the hub through the axes $12^x$, gear ring 11, pinions 17, planet cage 3 and sleeve 2, this latter engaging the hub bush 4 and the hub being driven at the "low" speed, the gear ring 13 being idle and having no effect on the hub. It will thus be seen that the sleeve 2 is only used to drive forward the hub for the "low" speed, the gear ring 13 being used for the "high" and "normal" gears. When, however, the motion of the driver is reversed for the purpose of applying the brake, the sleeve operates upon the brake with each speed. That is to say, owing to the ratchet mechanism between the ring 13 and hub 1, the reverse rotations of the driver, whatever the position of the pinion 15, can only impart motion to the sleeve, thus causing it when rotated backward to act with each speed upon the brake, and always through the "low" gear.

On the pedals of the bicycle being held stationary on any gear the ring 13 and ratchet mechanism allow of free-wheeling and on wheeling the bicycle backward, on any gear, the sleeve has no effect either on the hub or the brake, the drag friction being insufficient to produce any rotary action of the sleeve.

With the driver always in gear with the mechanism for producing the "low" gear there is no slipping of the pedals when changing the speeds. Furthermore, owing to the driver 9 always operating the brake through the low gear, the brake power is the same for all three speeds.

While preferring the improved combination of gear with the two sets of planetary pinions, I may employ any other and convenient arrangement of differential gearing capable of giving or allowing of three speeds, the main feature of the invention being the combination of a three speed gear of any suitable kind and a back-pedaling brake with the sleeve 2 whereby the hub may be driven forward at three different speeds and the brake may be applied with each speed, while on wheeling the bicycle backward by hand the brake will not be applied.

What I claim is:—

In the hub of a bicycle wheel or the like, the combination of an arrangement of variable speed gear capable of giving or allowing of three speeds, a back-pedaling brake and a sleeve having a spiral groove on its inner face, this latter being designed to engage either the hub or the brake according to the direction of rotation of the gear, and the said gear comprising two sets of planetary pinions, and two sun pinions whereof one is fixed and the other free to be moved endwise and be clutched either to the hub axle or the driving member, or lie clear of both, a planet pinion carrier by which one of the sets of planetary pinions is carried and on which is formed a screw-thread corresponding to the spiral groove in the said sleeve, a drag friction device acting on the sleeve, a gear ring in one with the driving member and meshing with the pinions carried by the said carrier, a further gear ring meshing with the other set of planetary pinions which are carried by the driver, and ratchet mechanism between this last named ring and the hub by which the ring transmits the motion of the pedals for the high and normal speeds, substantially as herein set forth.

In witness whereof I have hereunto set my hand in the presence of two witnesses.

JAMES ARCHER.

Witnesses:
 THOS. H. COOK,
 HORACE BUNN.